Feb. 13, 1951 G. HEPP 2,541,650

WAVE LENGTH MODULATION

Filed July 20, 1946 2 Sheets-Sheet 1

INVENTOR.
GERARD HEPP
BY Fred M Vogel
AGENT.

Feb. 13, 1951 G. HEPP 2,541,650

WAVE LENGTH MODULATION

Filed July 20, 1946 2 Sheets-Sheet 2

INVENTOR.
GERARD HEPP
BY Fred M. Vogel
AGENT.

Patented Feb. 13, 1951 2,541,650

UNITED STATES PATENT OFFICE 2,541,650

WAVE LENGTH MODULATION

Gerard Hepp, Eindhoven, Netherlands, assignor to Hartford National Bank and Trust Company, Hartford, Conn., as trustee Application July 20, 1946, Serial No. 685,194
In the Netherlands May 6, 1943

Section 1, Public Law 690, August 8, 1946
Patent expires May 6, 1963

10 Claims. (Cl. 332—18)

This invention relates to a circuit arrangement for acting upon the natural frequency of an oscillatory circuit by means of a variable inductance or capacity, the value of which is controlled by a modulating current or voltage and which forms part of the oscillatory circuit. Circuit arrangements of this kind are, for example, utilized in the frequency modulation of a carrier wave, in tuning the oscillatory circuits of a radio-receiver, in synchronizing a generator, etc.

In order to be able to vary the natural frequency of an oscillatory circuit, it is known to include in the oscillatory circuit a variable reactance, for example a reactance tube or an other variable capacity or inductance. By controlling the value of this variable capacity or inductance, the natural frequency of the oscillatory circuit is varied in the rythm of the modulating current or voltage. It may be desirable to be able to act upon the relation thus obtained between the amplitude of the modulating current or voltage and the natural frequency of the oscillatory circuit. If, for example, two circuits of variable natural frequencies must be adapted to each other in such a manner that for each oscillatory circuit the same relation exists between the natural frequency and the amplitude of a modulating current or voltage (the so-called modulation characteristic), the modulation characteristics of the two oscillatory circuits must be rendered identical to each other.

It may also be desirable that the modulation characteristic of an oscillatory circuit should be linear; that is to say that a linear relation exists between the amplitude of the modulating current or voltage and the natural frequency. This is of great importance especially with frequency modulation.

The manner in which the variable inductance or capacity is included in the oscillatory circuit influences the shape of the modulation characteristic. If, for example, the variable inductance or capacity is directly proportional to the amplitude of the modulating current or voltage and if the variable inductance is arranged in series with the capacity of the circuit, or the variable capacity is arranged in parallel with the inductance of the circuit, one obtains a better linearity of the modulation characteristic than if the variable inductance is connected in parallel with the capacity of the circuit, or if the variable capacity is connected in series with the inductance of the circuit.

It has previously been suggested, if the variable inductance is inversely proportional to the amplitude of the premagnetising modulating current, that the latter should be connected in parallel with the capacity of the circuit for the purpose of obtaining a linear modulation characteristic. The latter case occurs when ferromagnetic material is used for the core of the inductance coil, the permeability of which varies so as to be substantially inversely proportional to the amplitude of the modulating premagnetising current. It is, however, not simple to manufacture inductance coils whose inductance varies so as to be fully directly proportional or inversely proportional to the premagnetising modulating current. Even if such an inductance were used, a linear modulation characteristic would not be obtained, as will still be proved hereinafter.

According to the invention, a given desired relation between the amplitude of the modulating current or voltage and the natural frequency of the circuit is obtained by arranging impedances in parallel and/or in series with the variable inductance or capacity.

The invention will be described with reference to the accompanying drawing forming a part of the specification and in which.

Figure 2:
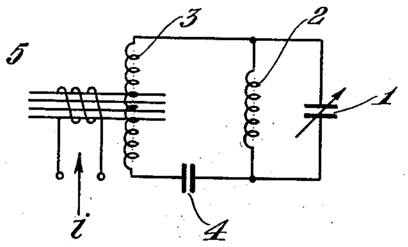
Fig. 2 is a schematic diagram of the basic modulating circuit according to the invention.
Figure 3:
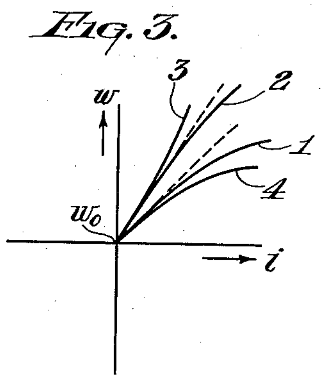
Figure 7:
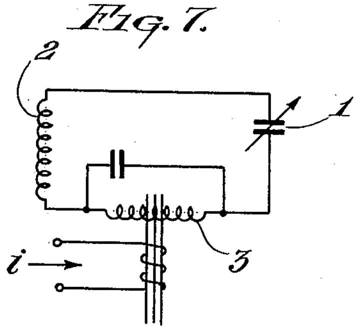
Figure 8:
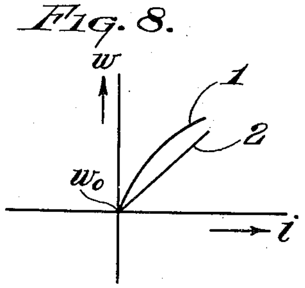
Figure 4:
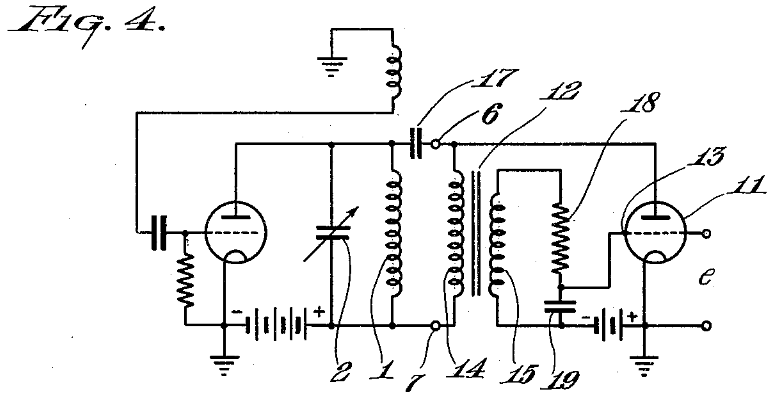
Figure 5:
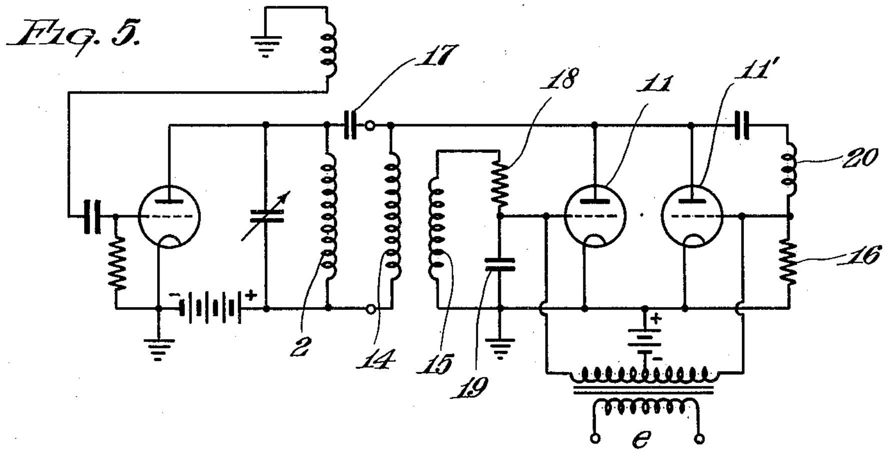
Figure 6:
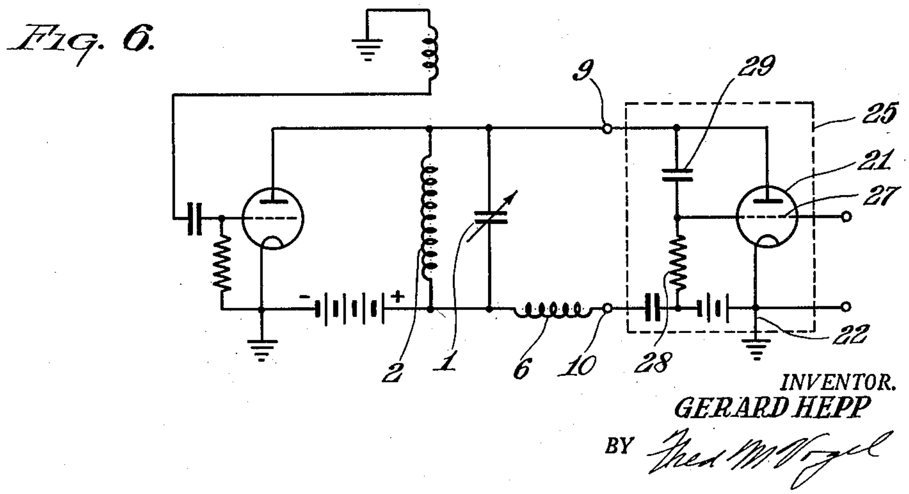

Fig. 3 is a graphical representation of the characteristics of the circuit arrangements according to the invention, Fig. 4 is a schematic diagram of another embodiment of the invention, Fig. 5 is a schematic diagram of an alternate embodiment of the circuit arrangement shown in Fig. 4, Fig. 6 is a schematic diagram of an alternate embodiment of the circuit arrangement shown in Fig. 2, Fig. 7 is a schematic diagram of a further embodiment of the invention, and Fig. 8 is a graphical representation of the characteristics of the circuit arrangement shown in Fig. 7.

Figure 1:
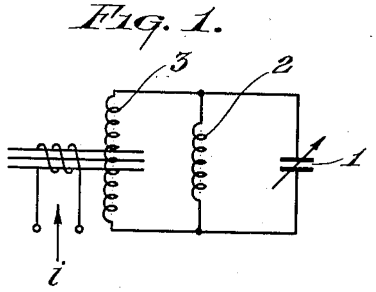
Fig. 1 is a schematic diagram of a modulating circuit upon which the invention is based.

Fig. 1 shows an oscillatory circuit constituted by a condenser 1 having the capacity $C_0$, an inductance coil 2 having the inductance $L_0$ and a variable inductance coil 3 which is connected in parallel with the latter and whose value L is inversely proportional to the premagnetising modulating current $i$ $$\left(L=\frac{a}{i}, a \text{ representing a constant}\right)$$

For the natural frequency $\omega$ of the circuit applies:

$$\omega^2=\frac{1}{L_0C_0}+\frac{1}{LC_0} \qquad (1)$$

if the variable inductance coil 3 were not present the natural frequency would be $\omega_0=(L_0C_0)^{-1/2}$. Consequently, due to the presence of the variable inductance coil 3, there occurs a frequency sweep $\Delta\omega=\omega-\omega_0$ and since the variable inductance coil 3 always has a high value relatively to the inductance 2, $\Delta\omega$ will be small. Equation 1 now changes into $$(\omega_0+\Delta\omega)^2=\omega^2_0 2+\frac{1}{LC_0}$$

or $$\frac{2\Delta\omega}{\omega_0}+\left(\frac{\Delta\omega}{\omega_0}\right)^2=\frac{L_0}{L}=(L_0a)i$$

It follows therefrom that for a large relative frequency sweep $$\left(\frac{\Delta\omega}{\omega_0}\right)$$

i. e. if $$\left(\frac{\Delta\omega}{\omega_0}\right)^2$$

is not negligible, the frequency sweep is no longer directly proportional to the premagnetising current $i$, that is to say there is no longer a linear relation between the natural frequency $\omega$ and the current $i$. According to the invention, by arranging a condenser 4 (Fig. 2) in series with the variable inductance coil 3, it is possible to act upon the relation which exists between the natural frequency and the premagnetising current and, more particularly, to establish a linear relation even if the relative frequency sweep is large, as it will appear hereinafter in the description. For the natural frequency $\omega$ of the oscillatory circuit there applies:

$$\omega^2=\frac{L_0C_0+LC+L_0C+\sqrt{(LC+L_0C-L_0C_0)^2=4L_02CC_0}}{2LL_0CC_0}$$

Since the second term under the radical sign is small relatively to the first, $L_0 \ll L$ and $C_0$ being of the same order of magnitude as C, there applies approximately:

$$\omega^2=\frac{L_0C_0+LC+L_0C+(LC+L_0C-L_0C_0)1+\frac{2L_02CC_0}{(L_0+L_0C-L_0C_0)^2}}{2LL_0CC_0}$$

If the variable inductance coil 3 and the condenser 4 were not present, the natural frequency of the circuit would be $\omega_0=(L_0C_0)^{-1/2}$. In the circuit according to the invention the frequency is $\omega$, resulting in a frequency sweep $\Delta\omega=\omega-\omega_0$. Consequently, $$\omega^2=(\omega_0+\Delta\omega)^2=\omega_0^2+2\omega_0\Delta\omega+(\Delta\omega)^2=\frac{1}{L_0C_0}+\frac{1}{LC_0}+\frac{L_0}{LC+L_0C-L_0C_0}$$

and therefrom it follows:

$$2\frac{\Delta\omega}{\omega_0}\left(1+\frac{\Delta\omega}{2\omega_0}\right)=\frac{L_0}{L}\left(1+\frac{L_0C_0}{LC+L_0C-L_0C_0}\right) \qquad (2)$$

If condenser 4 is not present this equation changes into Equation 1. Due to the arrangement of condenser 4, the right term of Equation 1 has now, however, become dependent on the capacity of condenser 4 so that the relation which exists between the relative frequency sweep (and consequently also the natural frequency of the circuit) and the premagnetising current may be acted upon by the value of condenser 4.

Since L is inversely proportional to the modulating premagnetising current $$i{:}L=\frac{a}{i}$$

a linear modulation characteristic will be obtained if:

$$\frac{2\Delta\omega}{\omega_0}=\frac{L_0}{L} \qquad (3)$$

since in this case the frequency sweep $\Delta\omega$ is directly proportional to the modulating current $i$ $$\Delta\omega=\left(\frac{L_0a\omega_0}{2}\right)i$$

From Equation 2 it then follows that $$\frac{\Delta\omega}{2\omega_0}=\frac{L_0C_0}{LC+L_0C-L_0C_0}$$

or with the aid of Equation 3

$$\frac{L_0}{4_L}=\frac{L_0C_0}{LC+L_0C-L_0C_0}$$

and since $L_0$ is small with respect to L, it follows therefrom $C=4C_0$.

In Fig. 3, curve 1 shows the relation which exists between the natural frequency of the circuit and the modulating current $i$ in the event of condenser 4 not being present. In this case the relation with a comparatively large frequency sweep is no longer linear at all. Curve 2 shows the substantially linear relation in a large range of frequencies if the value of condenser 4 is $4C_0$. If the latter is given a value small than $4C_0$, one obtains the relation shown in the curve 3.

If, instead of condenser 4, an inductance is connected in series with the variable inductance coil 3, then applies the relation shown in curve 4.

It is alternatively possible to utilize a negative inductance. A negative inductance may be realized with the aid of a circuit arrangement of the kind shown in Fig. 4. The circuit comprises a discharge tube 11 of which the anode and the cathode are connected to each other by means of the primary winding 14 of a transformer 12. The control grid 13 of tube 11 derives the control voltage from the impedance which is constituted by the series connection of a resistance 18 and a condenser 19 and which is connected to the secondary winding 15. If the resistance 18 has a high value with respect to the impedance of condenser 19 and if the coupling coefficient between the primary and secondary windings is negative, a negative inductance will occur between the input terminals 6, 7 of the transformer 12, that is to say the voltage supplied to the terminals 6, 7 lags in phase by 90° relatively to the current $i$ and increases at increasing frequency so as to be proportional to frequency. In practice use will be made of two reactance tubes in push-pull arrangement, as is shown in Fig. 5 wherein a second reactance tube 11' is supplied with a quadrature voltage by means of the network 20—16. The reactance of this circuit may in this case be given almost any value from negative very high to positive very high.

Similarly as mentioned in connection with Fig. 2, it can be calculated that in this case a linear modulation characteristic is obtained if the negative inductance has a value $-\frac{1}{4}$ time higher than that of the inductance 2.

Consequently, it is in general possible to give the modulation characteristic a desired variation by connecting an impedance of the correct value in series with the variable inductance coil, i. e. a capacitor 17 corresponding to the capacitor 4, in the case where the variable inductance is connected in parallel to the fixed inductance as shown in Figs. 4 and 5.

Fig. 6 shows a circuit arrangement in which the natural frequency of the circuit is controlled by a reactance tube 25 which is connected in parallel with the inductance of the circuit. A resistance 28 is interposed between the cathode 22 of this reactance tube and the control grid 27 and a condenser 29 between the control grid 27 and the anode 21. This reactance tube serves as a condenser the value of which is controlled by the voltage *e* set up at the control grid. It can be proved in a quite anologous manner that the modulation characterstic may be linearised by connecting an inductance 26 in series with the reactance tube. The term "modulation characteristic" is now to be understood to mean the relation which exists between the natural frequency of the circuit and the value of the modulating voltage *e* set up at the control grid 27 of the reactance tube 25.

The action upon the natural frequency of the oscillatory circuit need not solely be effected by connecting an impedance in series with the variable capacity or inductance, but it is alternatively possible that this is effected by connecting an impedance in parallel with the variable reactance. Fig. 7, for example, shows an inductance coil 33 which can be controlled by a premagnetising modulating current and which is connected in series with condenser 31 and coil 32 of the oscillatory circuit. This is preferably effected if the value of the variable inductance coil forms rather a linear relation with the value of the premagnetising current. The associated modulation characteristic is shown by curve 2 in Fig. 8. Now, by arranging an impedance in parallel with the coil 33, it is possible again to act at will upon the modulation characteristic, for example to linearise the modulation characteristic by arranging a condenser 34 having a capacity which is ¾ time greater than that of the condenser 1. The result is shown by the curve 2 in Fig. 8.

What I claim is:

1. A circuit arrangement for frequency-modulating an electric wave about a given center frequency, comprising a resonant circuit having an inductor and a capacitor connected in parallel relationship and tuned to the center frequency of said electric wave, a series circuit comprising an element of fixed reactance of a given sign and a reactance tube circuit element of opposite sign connected across said resonant circuit, said reactance tube circuit element having a central value at which variations in the value thereof produce non-linear variations in the value of the tuning frequency of said resonant circuit, and means to apply modulating potentials to said reactance tube circuit element to vary the reactance value thereof and thereby frequency modulate said wave about said center frequency linearly proportional to the amplitude of said modulating potentials, said fixed reactance element and said reactance tube circuit element having correlated values at which the non-linearity in frequency modulation produced by a variation in reactance of said reactance tube circuit element taken alone is counteracted by the influence of the fixed reactance element to thereby effect linear modulation.

2. A circuit arrangement for frequency-modulating an electric wave about a given center frequency, comprising a resonant circuit having an inductor and a capacitor connected in parallel relationship and tuned to the center frequency of said electric wave, a series circuit comprising a capacitor and an inductor having a ferromagnetic core coupled across said resonant circuit, and means to apply modulating potentials to said core to vary the permeability thereof and vary the inductance value of said inductor to frequency modulate said wave about said center frequency linearly proportional to the amplitude of said modulating potentials, said inductor of said series circuit having a central value at which variations in the value thereof produce non-linear variations in the value of the tuning frequency of said resonant circuit, and said inductor and said capacitor of said series circuit having correlated values at which the non-linearity in frequency modulation produced by a variation in reactance of said inductor of said series circuit taken alone is counteracted by the influence of said capacitor of said series circuit to thereby effect linear modulation.

3. A circuit arrangement for frequency-modulating an electric wave about a given center frequency, comprising a first circuit having a capacitor and a variable inductor having a ferromagnetic core connected in parallel relationship, a series circuit comprising a capacitor and a fixed inductor coupled across said first circuit and tuned to the center frequency of said wave, said variable inductor having a central value at which variations in the value thereof produce non-linear variations in the value of the tuning frequency of said series circuit, and means to apply modulating currents to said ferromagnetic core to vary the permeability thereof and vary the inductance value of said variable inductor to frequency modulate said wave about said center frequency linearly proportional to the amplitude of said modulating currents, the capacitor and variable inductor of said first circuit having correlated values at which the non-linearity in frequency modulation produced by a variation in reactance of said variable inductor taken alone is counteracted by the influence of said capacitor of said first circuit to thereby effect linear modulation.

4. A circuit arrangement for frequency-modulating an electric wave about a given center frequency, comprising a resonant circuit having an inductor and a capacitor connected in parallel relationship and being tuned to the center frequency of said electric wave, a series circuit comprising a second capacitor and a second inductor having a ferromagnetic core coupled across said resonant circuit, the capacity of said second capacitor being substantially four times the capacity of the capacitor of said resonant circuit, and means to apply modulating potentials to said ferromagnetic core to vary the permeability thereof and vary the inductance value of said second inductor to frequency modulate said wave about said center frequency linearly proportional to the amplitude of said modulating potentials, said second inductor having a central value at which variations in the value thereof produce non-linear variations in the value of the tuning frequency of said resonant circuit, and said second capacitor and said second inductor having correlated values at which the non-linearity in frequency modulation produced by a variation in reactance of said second inductor taken alone is counteracted by the influence of said second capacitor to thereby effect linear modulation.

5. A circuit arrangement for frequency-modulating an electric wave about a given center frequency, comprising a resonant circuit having a fixed inductor and a capacitor connected in series relationship and being tuned to the center frequency of said electric wave, a shunt circuit comprising a second capacitor and a variable inductor having a ferromagnetic core interposed between the fixed inductor and the capacitor of said resonant circuit, said second capacitor having a capacity of the order of 1¾ times the capacity of the capacitor of said resonant circuit, said variable inductor having a central value at which variations in the value thereof produce non-linear variations in the value of the tuning frequency of said resonant circuit, and means to apply modulating potentials to said ferromagnetic core to vary the permeability thereof and vary the inductance value of said inductor to frequency modulate said wave about said center frequency linearly proportional to the amplitude of said modulating potentials, said second capacitor and said variable inductor having correlated values at which the non-linearity in frequency modulation produced by a variation in reactance of said variable inductor taken alone is counteracted by the influence of said second capacitor to thereby effect linear modulation.

6. A circuit arrangement for frequency-modulating an electric wave about a given center frequency, comprising a resonant circuit having an inductor and a capacitor connected in parallel relationship and being tuned to the center frequency of said electric wave, a series circuit comprising a variable capacitor element and fixed inductor coupled across said resonant circuit, said variable capacitor element having a central value at which variations in the value thereof produce non-linear variations in the value of the tuning frequency of said resonant circuit and the inductance value of said fixed inductor being ¾ of the inductance value of the inductor of said resonant circuit, and means to apply modulating potentials to said variable capacitor element to vary the capacity value thereof to frequency modulate said wave about said center frequency linearly proportional to the amplitude of said modulating potentials, said variable capacitor element and said fixed inductor having correlated values at which the non-linearity in frequency modulation produced by a variation in reactance of said variable capacitor element taken alone is counteracted by the influence of said fixed inductor to thereby effect linear modulation.

7. A circuit arrangement for frequency-modulating an electric wave about a given center frequency, comprising a resonant circuit having an inductor and a capacitor connected in parallel relationship and being tuned to the center frequency of said electric wave, a series circuit comprising a reactance tube circuit element and fixed inductor coupled across said resonant circuit, said reactance tube circuit element having a central value at which variations in the value thereof produce non-linear variations in the value of the tuning frequency of said resonant circuit and said fixed inductor having an inductance value substantially ¾ of the inductance value of said resonant circuit, and means to apply modulating potentials to said reactance tube circuit element to vary the capacity value thereof to frequency modulate said wave about said center frequency linearly proportional to the amplitude of said modulating potentials, said reactance tube circuit element and said fixed inductor having correlated values at which the non-linearity in frequency modulation produced by a variation in the reactance of said reactance tube circuit element taken alone is counteracted by the influence of said fixed inductor to thereby effect linear modulation.

8. A circuit arrangement for frequency-modulating an electric wave about a given center frequency, comprising a first circuit comprising an inductive reactance element and a capacitive reactance element connected in parallel relationship, a second circuit comprising an inductive reactance element and a capacitive reactance element connected in series relationship across said first circuit, one of said circuits being tuned to said given center frequency and the other of said circuits having one reactance element thereof variable, said variable reactance element having a central value at which variations in the value thereof produce non-linear variations in the value of the tuning frequency of said tuned circuit, and means to apply modulating potentials to said variable reactance element to vary the reactance value thereof and thereby frequency modulate said wave about said center frequency proportional to the amplitude of said modulating potentials, the inductive and capacitive reactance elements of said other circuit having correlated values at which the non-linearity in frequency modulation produced by a variation in reactance of said variable reactance element taken alone is counteracted by the influence of the other reactance element of said second circuit to thereby effect linear modulation.

9. A circuit arrangement for frequency-modulating an electric wave about a given center frequency, comprising a first circuit comprising an inductive reactance element and a capacitive reactance element connected in parallel relationship, a second circuit comprising an inductive reactance element and a capacitive reactance element connected in series relationship across said first circuit, said first circuit being tuned to said given center frequency and said second circuit having one reactance element thereof variable, said variable reactance element having a central value at which variations in the value thereof produce non-linear variations in the value of the tuning frequency of said first circuit, and means to apply modulating potentials to said variable reactance element to vary the reactance value thereof and thereby frequency modulate said wave about said center frequency proportional to the amplitude of said modulating potentials, the inductive and capacitive reactance elements of said second circuit have correlated values at which the non-linearity in frequency modulation produced by a variation in reactance of said variable reactance element taken alone is counteracted by the influence of the other reactance element of said second circuit to thereby effect linear modulation.

10. A circuit arrangement for frequency-modulating an electric wave about a given center frequency, comprising a first circuit comprising an inductive reactance element and a capacitive reactance element connected in parallel relationship, a second circuit comprising an inductive reactance element and a capacitive reactance element connected in series relationship across said first circuit, said first circuit having a reactance element thereof variable and said second circuit being tuned to said given center frequency, said variable reactance element having a central value at which variations in the value thereof produce non-linear variations in the value of the tuning frequency of said second circuit, and means to apply modulating potentials to said variable reactance element to vary the reactance value thereof and thereby frequency modulate said wave about said center frequency proportional to the amplitude of said modulating potentials, the inductive and capacitive reactance elements of said first circuit having correlated values at which the non-linearity in frequency modulation produced by a variation in reactance of said variable reactance element taken alone is counteracted by the influence of the other reactance element of said first circuit to thereby effect linear modulation.

GERARD HEPP.

REFERENCES CITED

The following references are of record in the file of this patent:

UNITED STATES PATENTS

| Number | Name | Date |
|---|---|---|
| 2,000,584 | Fichandler | May 7, 1935 |
| 2,243,921 | Rust et al. | June 3, 1941 |
| 2,341,040 | Hathaway | Feb. 8, 1944 |
| 2,346,331 | Roberts | Apr. 11, 1944 |
| 2,351,368 | Roberts | June 13, 1944 |
| 2,374,000 | Crosby | Apr. 17, 1945 |
| 2,382,615 | Donley | Aug. 14, 1945 |
| 2,473,556 | Wiley | June 21, 1949 |